United States Patent [19]
Ohgami et al.

[11] Patent Number: 5,574,625
[45] Date of Patent: Nov. 12, 1996

[54] PORTABLE INFORMATION PROCESSING APPARATUS HAVING MULTIPLE ROTATABLE PORT COVERS

[75] Inventors: Keizo Ohgami; Ryo Hosoya, both of Tokyo, Japan

[73] Assignee: Kabushiki Kaisha Toshiba, Kawasaki, Japan

[21] Appl. No.: 506,170

[22] Filed: Jul. 25, 1995

Related U.S. Application Data

[63] Continuation of Ser. No. 80,917, Jun. 22, 1993, abandoned.

[30]    Foreign Application Priority Data

Jun. 22, 1992  [JP]  Japan ............................ 4-163029
Sep. 25, 1992  [JP]  Japan ............................ 4-066973

[51] Int. Cl.$^6$ .......................... G06F 1/16; H05K 7/16
[52] U.S. Cl. .................... 361/684; 361/616; 361/683; 361/727; 439/142; 312/291; 312/292; 312/223.2
[58] Field of Search ..................... 364/708.1; 439/133, 439/135, 136, 137, 142, 928, 928.1; 312/291, 292, 223.1, 223.2; 200/50 A; 361/616, 679–687, 724–727

[56]          References Cited

U.S. PATENT DOCUMENTS

| | | | |
|---|---|---|---|
| 4,545,023 | 10/1985 | Mizzi | 361/680 X |
| 4,894,792 | 1/1990 | Mitchell et al. | |
| 5,058,045 | 10/1991 | Ma . | |
| 5,116,261 | 5/1992 | Lan et al. | 312/292 |
| 5,176,523 | 1/1993 | Lai . | |
| 5,199,888 | 4/1993 | Condra et al. | 439/142 |
| 5,227,957 | 7/1993 | Deters | 361/683 X |
| 5,260,854 | 11/1993 | Hileman et al. . | |
| 5,299,089 | 3/1994 | Lwee . | |
| 5,324,204 | 6/1994 | Lwee . | |

OTHER PUBLICATIONS

"Incredible shrinking computers", 8045 IEEE Spectrum 28(1991)May, No. 5, New York, US, pp. 37–41.
COMPAQ LTE Lite/25 and COMPAQ LTE Lite/20 Features Overview Product Illustration p. 4, no date.

*Primary Examiner*—Michael W. Phillips
*Attorney, Agent, or Firm*—Limbach & Limbach

[57]          ABSTRACT

A portable information processing apparatus includes a housing storing electronic components. The housing includes first to third card storage portions having insertion ports open to one side surface of the housing, respectively, for card-like electronic components. A first cover is provided on the housing and rotatable between a closed position wherein the insertion port of the first card storage portion is closed by the first cover and an opened position wherein the insertion port of the first card storage portion open. A second cover is provided on the housing to be movable between a closed position wherein the first cover located in the closed position and the insertion ports of the second and third card storage portions are covered with the second cover and an opened position wherein the first cover and the insertion ports of the second and third card storage portions are exposed.

10 Claims, 12 Drawing Sheets

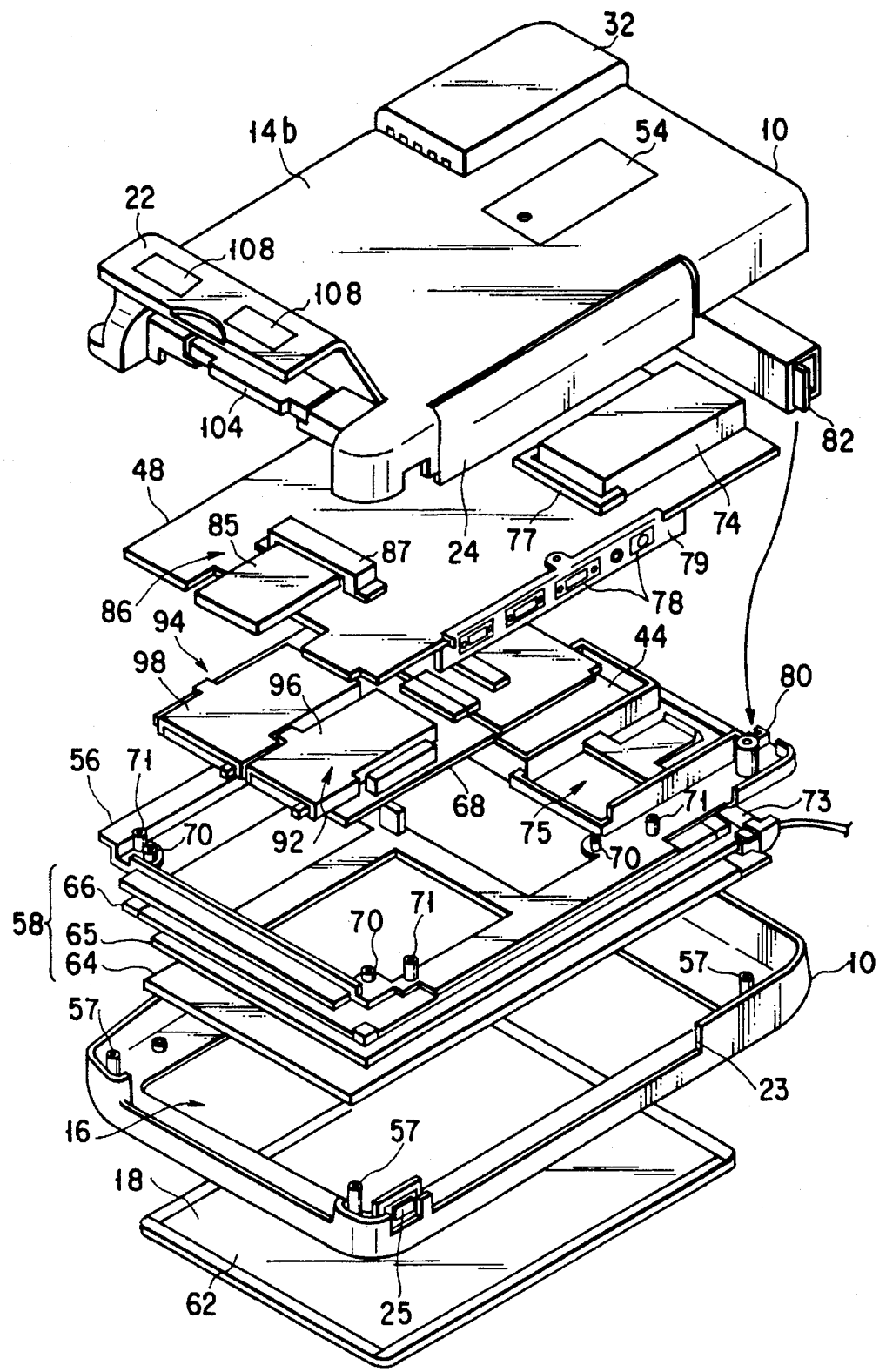
F I G. 6

5,574,625

PORTABLE INFORMATION PROCESSING APPARATUS HAVING MULTIPLE ROTATABLE PORT COVERS

This is a continuation of application Ser. No. 08/080,917 filed on Jun. 22, 1993, now abandoned.

BACKGROUND OF THE INVENTION

1. Field of the Invention

The present invention relates to portable information processing apparatuses such as a portable computer or a portable wordprocessor.

2. Description of the Related Art

Recently, in portable computers having a keyboard or portable computers of an integrated display/input type using a tablet and a pen, many of the computers use a memory card having a volatile memory in order to increase the memory capacity of the computers. A portable computer in which this memory card can be fitted has a card slot exposed outside the housing, and the card slot is closed with a cover unless the memory card is mounted or dismounted from the housing. In recent years, there have been developed an interface card, having almost the same shape as that of the memory card, for communicating with an external device, or an application card having almost the same shape as that of the memory card and storing an application program. Since the portable computer in which this interface or application card can be detachably mounted may use the interface or application card together with the memory card, the portable computer has an interface/application card slot in addition to the memory card slot. In communication between the external device and this portable computer by means of the interface card, an external cable must be connected to the interface card mounted in the card slot. For this reason, the card slot cannot be closed with the cover due to the presence of the external cable.

In the portable computer having an interface or application card slot in addition to a memory card slot, a connector to which a card is to be connected is arrange in each card slot. These connectors are mounted on a circuit board arranged in the computer housing. When the computer has only one circuit board, the plurality of connectors are laterally aligned on the board, and the card slots are laterally aligned in the side surface of the housing accordingly. The ratio of the area of the card slots to the area of the entire side surface of the computer housing increases to interfere with arrangement of a power switch, various connectors and the like on the side surface of the computer housing.

In the computer housing is arranged an ejector for guiding the card, which is inserted into the housing through the card slot, to the connector and for ejecting the card outside the housing. This ejector is arranged for each card slot. For this reason, when a plurality of ejectors are laterally aligned on the circuit board of the housing, a large space is required for the ejectors, thereby failing to provide a compact computer.

when a volatile memory card slot and an interface or application card slot are to be closed with one cover, an operator may erroneously remove the memory card although he actually wants to remove the interface or application card. When the memory card is erroneously removed, important data is erased because the memory card comprises a volatile memory.

In the computer in which an interface card can be detachably mounted, an external cable is connected to the interface card, so that the cover of the slot cannot be closed upon mounting the interface card. When the cover cannot be closed, the interior of the computer is exposed, and dust and the like tends to enter inside the computer, thereby causing erroneous operations and failures of the computer.

SUMMARY OF THE INVENTION

The present invention has been made in consideration of the above circumstances, and its object is to provide a more compact portable information processing apparatus in which a plurality of cards can be detachably mounted.

It is another object of the present invention to provide a portable information processing apparatus in which a plurality of card-like electronic parts including a volatile card can be detachably mounted, and erroneous removal of the volatile card can be prevented.

It is still another object of the present invention to provide a portable information processing apparatus in which an interface card can be detachably mounted, and dust and the like can be prevented from entering inside the apparatus even if an external cable is connected to the interface card.

It is still another object of the present invention to provide a pen input type information processing apparatus or an integrated display/input information processing apparatus which is excellent in operability and reliability and in which a display unit and an input unit are formed integrally.

In order to achieve the above objects according to the present invention, there is provided an information processing apparatus comprising a housing storing electronic components, the housing having a plurality of storage portions for storing optional parts. The storage portions have insertion ports open to one side surface of the housing, respectively. The information processing apparatus comprises a first cover mounted on the housing and rotatable between a closed position in which the insertion port of one of the storage portions is closed and an opened position in which the insertion port of the one storage portion is open, and a second cover mounted on the housing to be rotatable between a closed position in which the first cover in the closed position and the insertion port of another storage portion are covered with the second cover and an opened position in which the first cover and the insertion port of this other storage portion are open.

With the above structure, when the second cover is opened so as to remove an optional part stored in the storage portion, the insertion port of the one storage portion is closed by the first cover. For this reason, for example, when a volatile memory card is stored in the one storage portion, and erroneous removal of the volatile memory card during removal of the other optional part can be prevented.

According to the information processing apparatus of the present invention, the second cover has a through port opposing the insertion port of one of the storage portions in the closed position, and a third cover mounted on the second cover to be rotatable between a closed position in which the through port of the second cover is closed and an opened position for opening the through port. When a card-like electronic part having connecting terminals, to which a cable can be connected, is mounted in the one storage portion, the cable can be connected to the terminals through the through port by opening only the third cover. Therefore, even if the cable is connected to the card-like electronic part in the storage portion, dust and the like will not enter inside the housing.

In the information processing apparatus according to the present invention, the housing has first and second storage portions for storing card-like electronic parts. The first and second storage portions are stacked in a direction substantially perpendicular to the upper and bottom surfaces of the housing, i.e., in a direction of thickness of the housing. Similarly, the insertion ports of these storage portions are formed in a side surface of the housing in the direction of thickness of the housing, accordingly.

As compared with a structure in which two insertion ports are arranged in a direction parallel to the upper surface of the housing, the housing in the present invention can be made compact, and connecting terminals and the like can be easily provided on the side surface of the housing.

An information processing apparatus according to the present invention comprises: a circuit board arranged inside a housing in substantially parallel to upper and bottom surfaces of the housing; first and second storage portions provided on the circuit board and having insertion ports open to a side surface of the housing, respectively, for storing card-like electronic parts; and first and second ejectors mounted on the circuit board and disposed in the first and second storage portions, respectively, for ejecting the card-like electronic components from the first and second storage portions. Each of the first and second ejectors includes a pair of side walls extending in an insertion direction of the card-like electronic component and opposing each other, an operation portion projecting from one of the side walls and storing an ejection operation member, and a fixing portion projecting from the other of the side walls, offset from the operation portion in the insertion direction, and fixed to the circuit board. The first and second ejectors are arranged next to each other in a state wherein the operation portion of the first ejector overlaps the fixing portion of the second ejector in the insertion direction.

As described above, since the operation portion of the first ejector and the fixing portion of the second ejector overlap each other in the insertion direction of the card-like electronic component, the distance between the two ejectors can be reduced, thereby providing a compact information processing apparatus.

An information processing apparatus according to the present invention comprises: a housing which has a main body and an upper case engaged with the main body and having an opening; a plate-like display/input device arranged in the housing to face to the opening and having a display portion and an input portion disposed in a stacked state; a support frame fixed to the upper case and positioned in the housing, the display/input device being clamped between the upper case and the support frame; and a circuit board fixed to the support frame and disposed in the housing between the support frame and the main body.

In the apparatus having the above structure, the display/input device is located on one side of the support frame, and the circuit board is located on the other side thereof. The resultant assembly is mounted on the upper case. For this reason, mounting and assembly of the respective components can be facilitated.

An information processing apparatus according to the present invention comprises: a housing having an upper case with an opening; a plate-like display/input device arranged in the housing to face the opening and having a display portion and an input portion disposed in a stacked state; a transparent plate-like cover fixed to an outer surface of the upper case so as to close the opening and opposing the display/input device with a predetermined distance; and input means for inputting desired information to the input portion of the input/display device through the cover.

With the apparatus having the above structure, since the predetermined distance is defined between the cover and the input/display device, the cover will not be brought into contact with the input/display device even if the cover flexes during an information input by using the input means. As a result, damage to the input/display device can be prevented.

An information processing apparatus according to the present invention comprises: a substantially rectangular housing having an upper case with an opening; a plate-like display/input device arranged in the housing to face the opening and having a display portion and an input portion disposed in a stacked state; and a battery pack and a disk drive which are disposed in the housing. The battery pack and the disk drive are disposed to obtain an optimal weight balance of the housing in consideration of holding stability and operability of the apparatus when an operator holds the housing to perform an input operation. Specifically, the battery pack is located at a corner of the housing which is defined by a side surface of the housing on the operator side when the operator holds the housing.

Various connectors, to which various devices are to be connected, are provided on that side surface of the housing which faces in a direction departing from an operator when the operator holds the housing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 to 14 show an integrated input/display computer according to an embodiment of the present invention, in which:

FIG. 1 is a perspective view of the computer;

FIG. 2 is a perspective view of the computer when viewed from a direction different from that in FIG. 1;

FIG. 3 is a plan view of the computer;

FIG. 4 is a perspective view showing the bottom surface of the computer in a state wherein a battery pack is removed from the computer;

FIG. 5 is an exploded perspective view in a state wherein a battery cover is removed;

FIG. 6 is an exploded perspective view showing the overall structure of the computer;

FIG. 7 is a perspective view of the computer in a state wherein a second cover is open;

FIG. 8 is a sectional view of the computer along the line VIII—VIII in FIG. 7;

FIG. 9 is a perspective view showing a card insertion port;

FIG. 10 is a perspective view of card ejectors;

FIG. 11 is an exploded perspective view of the card ejectors;

FIG. 12 is a perspective view showing a process for removing the card ejector;

FIG. 13 is a schematic perspective view showing a state in which a short side of the computer faces the operator; and FIG. 14 is a schematic perspective view showing a state in which a long side of the computer faces the operator.

DETAILED DESCRIPTION OF THE PREFERRED EMBODIMENTS

An integrated input/display type computer according to an embodiment of the present invention will be described in detail with reference to the accompanying drawings.

Figure 1:
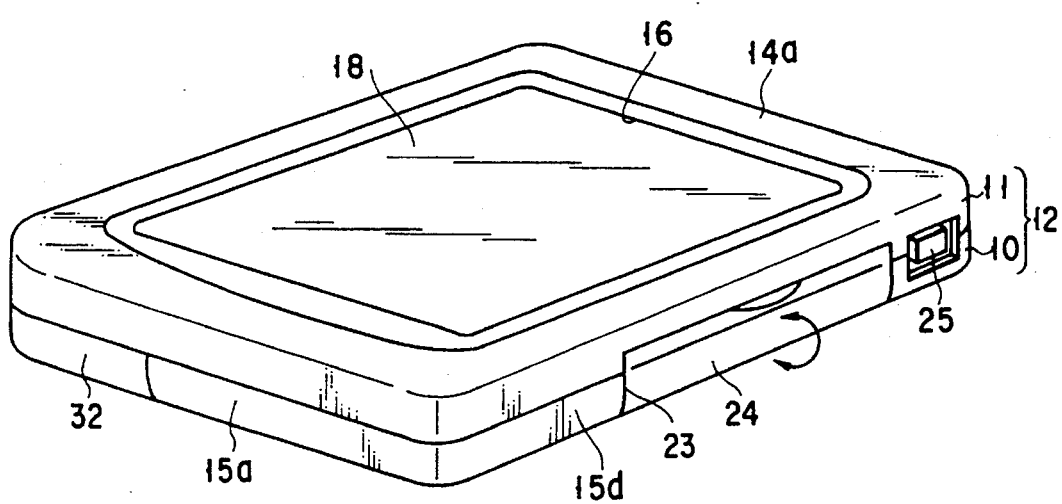
Figure 2:
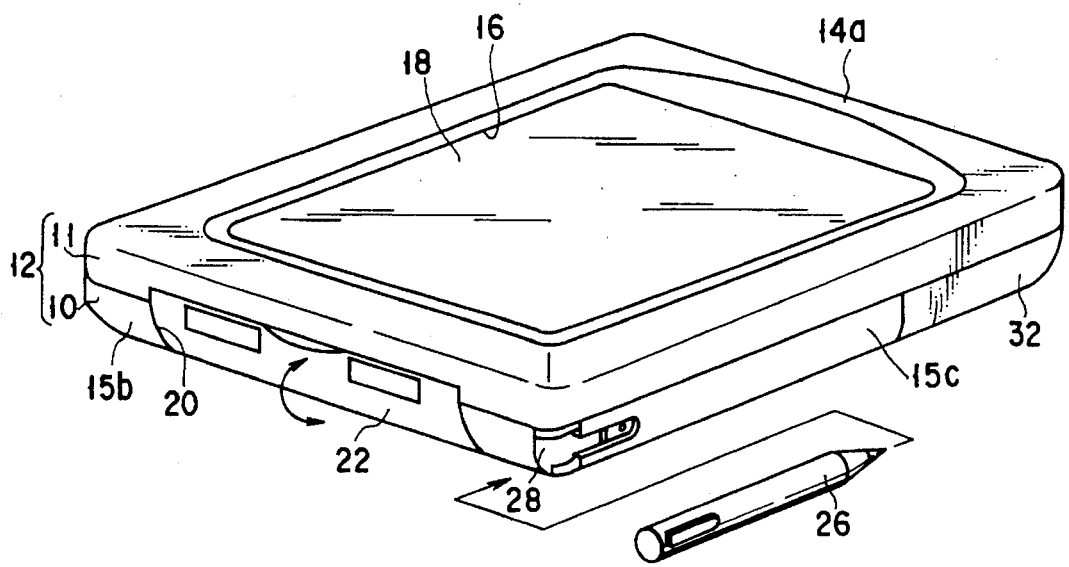

FIG. 1 is a perspective view showing the outer appearance of the computer viewed from the front side surface thereof, and FIG. 2 is a perspective view showing the computer viewed from the rear side surface thereof.

Figure 3:
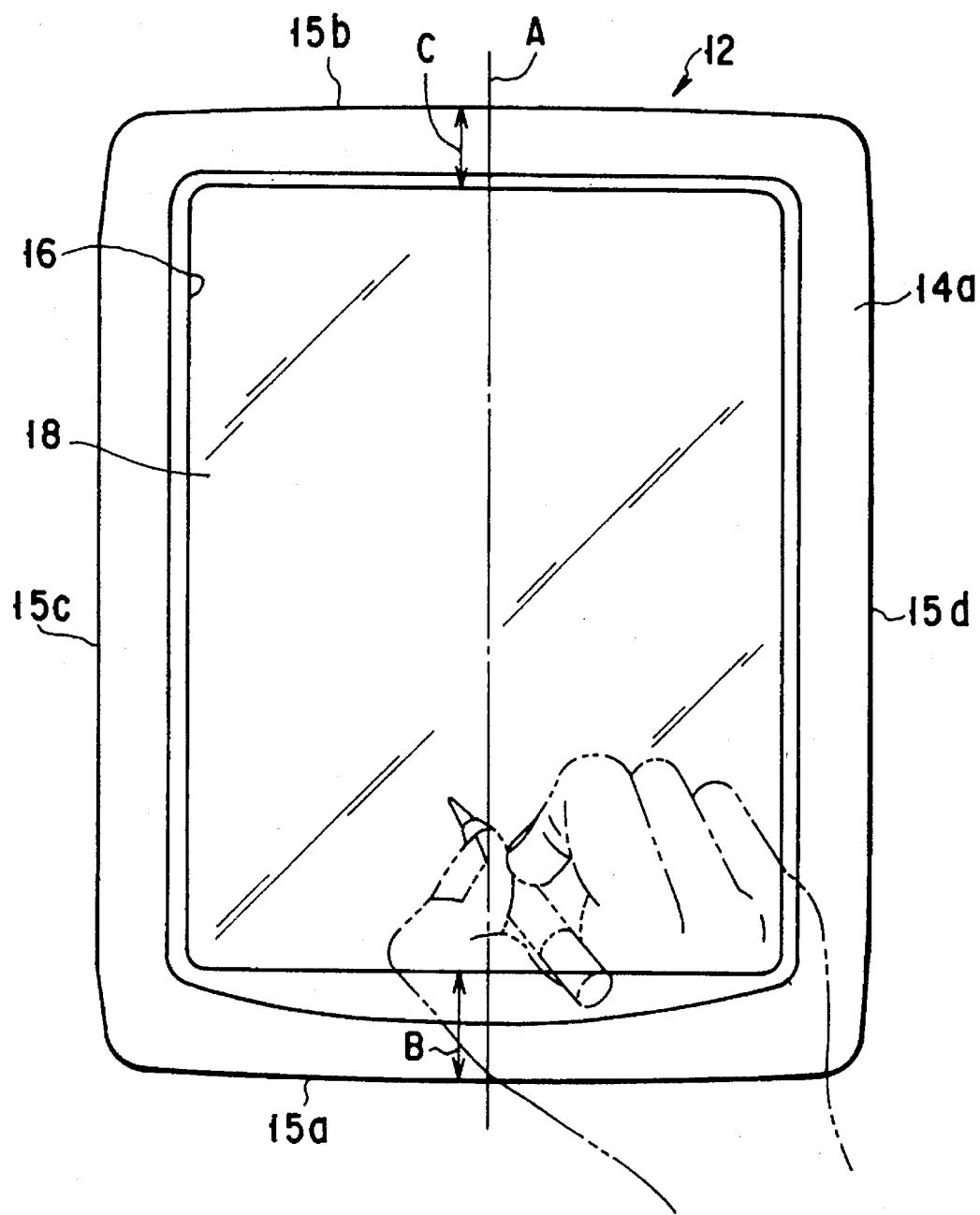

As shown in FIGS. 1 to 3, the integrated display/input type computer comprises a housing 12 which has a body case 10 and an upper case 11 engaged with the body case 10. The housing 12 has a flat box-like shape and includes substantially rectangular upper and bottom surfaces 14a and 14b, first and second side surfaces 15a and 15b extending in a direction perpendicular to a longitudinal axis A of the housing, and third and fourth side surfaces 15c and 15d extending parallel to the longitudinal axis A. As will be described later, when the computer is used in a state wherein a short side thereof faces an operator (to be described later), the first side surface 15a of the housing 12 faces the operator. However, when the computer is used in a state wherein a long side thereof faces an operator, the third side surface 15c of the housing faces the operator.

A rectangular opening 16 similar to the upper surface 14a is formed in the upper surface 14a of the housing 12. This opening 16 is closed with a protective cover 18 formed of a transparent acrylic plate which is fixed to the upper surface 14a. An input/display device (to be described later) is arranged in the housing 12 so as to oppose the protective cover 18. The opening 16 is offset from the first side surface 15a toward the second side surface 15b. For this reason, a distance B between the first side surface 15a and the edge of the opening 16 is larger than a distance C between the second side surface 15b and the edge of the opening 16.

The housing 12 has a recess 20 opening to the second side surface 15b and the bottom surface 14b of the housing 12. Insertion ports of a plurality of storage portions for storing card-like electronic components (to be described later) are open in the recess 20. The recess 20 is closed with a connector cover 22 (second cover) rotatably mounted on the housing 12. A connector opening 23 is formed in the fourth side surface 15d of the housing 12. An RS232C serial communication port, a parallel port, a connector for an external floppy disk drive, a connector for an external keyboard, and the like are arranged in the opening 23. The connector opening 23 is closed or opened by a connector cover 24 rotatably mounted on the housing 12. A power switch 33 for turning on or off the computer is arranged on the fourth side surface 15d.

A pen storage portion 28 for removably storing a stylus pen 26 serving as an input member is formed in the body case 10. The pen storage portion 28 extends along the third side surface 15c of the housing 12 and is open at a corner of the housing which is defined by the second and third side surfaces 15b and 15c.

Figure 4:
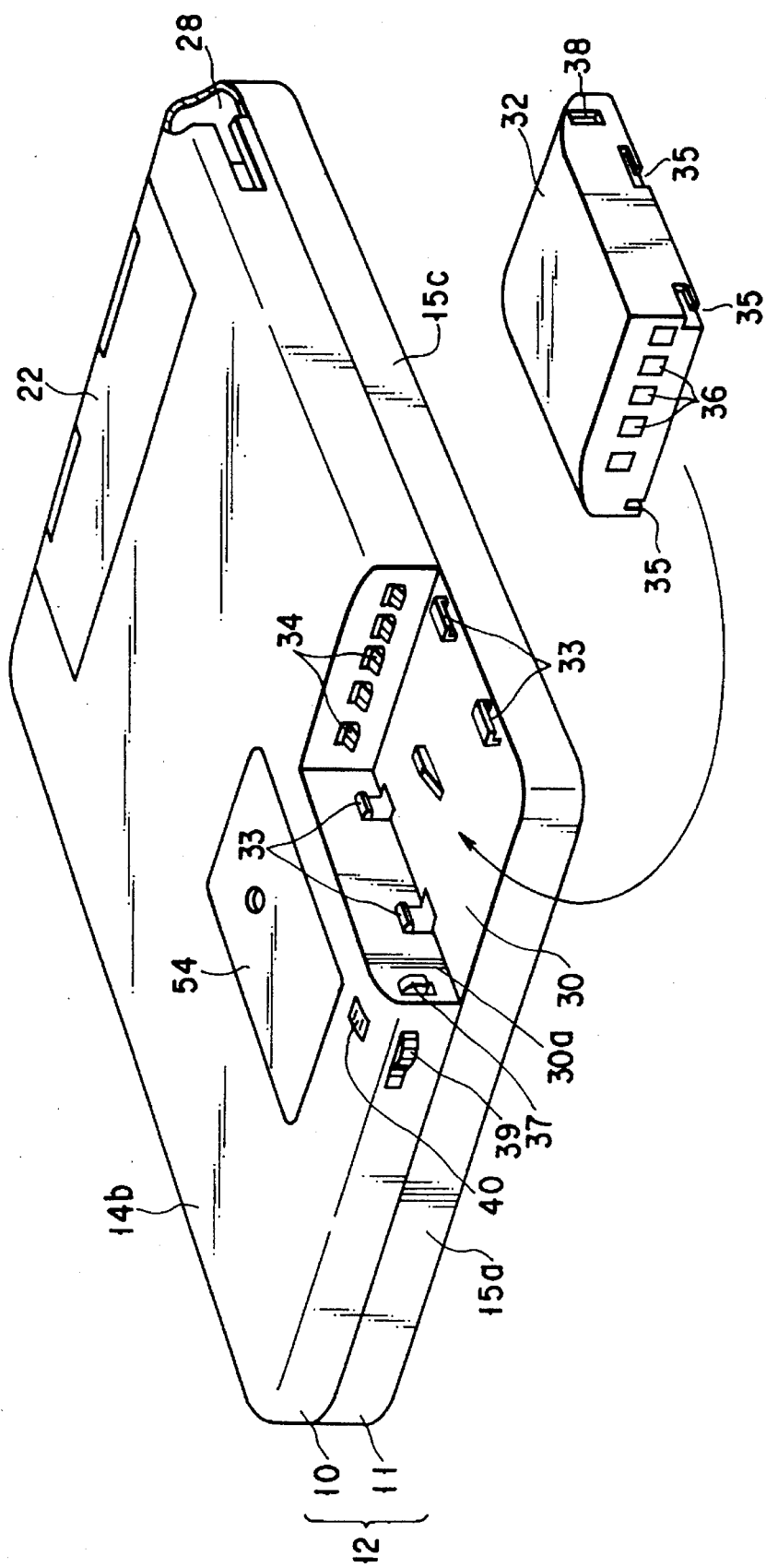
Figure 5:
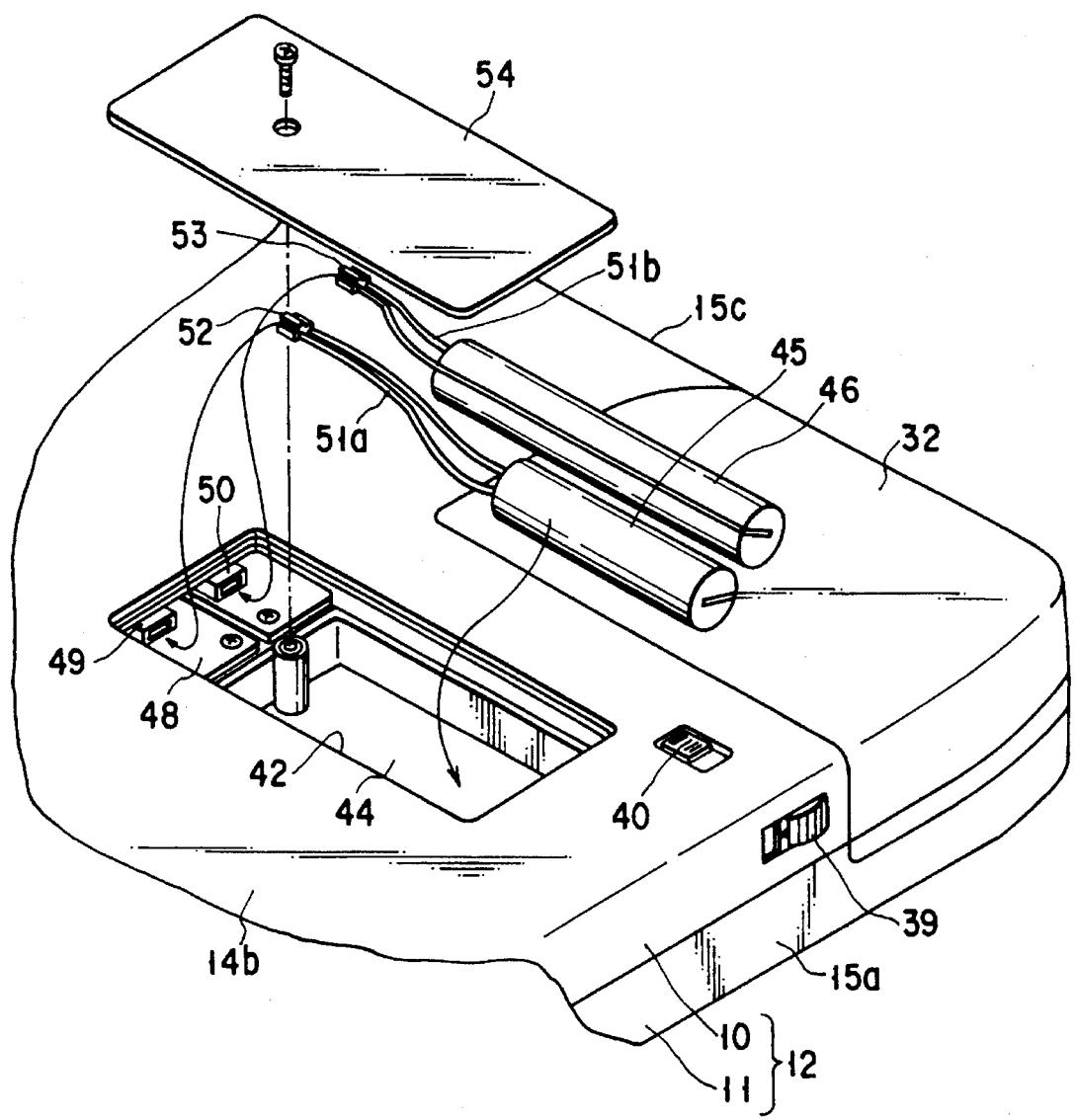

As shown in FIGS. 4 and 5, at a corner defined by the first and third surfaces 15a and 15c of the housing 12, a battery pack storage portion 30 is formed in the body case 10. The battery pack storage portion 30 is constituted by a recess open to the first and third side surfaces 15a and 15c and the bottom surface 14c of the housing 12. A battery pack 32 having a shape substantially the same as that of the recess is detachably mounted in the battery pack storage portion 30. When the battery pack is stored in the battery pack storage portion 30, the outer surface of the battery pack 32 constitutes part each of the first and third side surfaces 15a and 15c and the bottom surface 14b of the housing 12. In this manner, the battery pack storage portion 30 is open to the three surfaces of the housing, so that the space of the storage portion 30 in the housing 12 can be reduced, thereby obtaining a compact, low-profile housing.

A plurality of engaging projections 33 and a plurality of contact terminals 34 are the walls of the body case 10 which define the battery pack storage portion 30. The battery pack 32 has a plurality of engaging recesses 35 to be engaged with the engaging projections 33 and a plurality of terminals 36 to be brought into contact with the contact terminals 34. Of all the walls defining the battery pack storage portion 30, a wall 30a extending in a direction perpendicular to the bottom surface 14b of the housing 12 has an extendible stopper 37. The stopper 37 is biased by a spring (not shown) to project inside the storage portion 30. When the stopper 37 is engaged with a recess 38 formed in the battery pack 32, the battery pack 32 is held in the storage portion 30. By sliding a release lever 39 provided on the first side surface 15a of the housing 12, the stopper 37 recedes from the battery pack storage portion 30, thereby allowing the battery pack 32 to be removed from the battery pack storage portion 30. Note that reference numeral 40 denotes a lock lever for locking the release lever 39.

A rectangular opening 42 is formed in the bottom surface 14b of the housing 12. An auxiliary battery storage portion 44 communicating with the opening 42 is formed in the housing 12. An RTC (Real Time Clock) battery 45 and an auxiliary battery 46 are stored in the battery storage portion 44 so as to be removable through the opening 42. Part of a circuit board 48 arranged inside the housing 12 is exposed through the opening 42. Connectors 49 and 50 are mounted on the exposed portion of the circuit board 48. A connector 52 is connected to the RTC battery 45 through a cable 51a. The connector 52 is detachably connected to the connector 49 on the circuit board 48. A connector 53 is connected to the auxiliary battery 46 through a cable 51b. The connector 53 is detachably connected to the connector 50 on the circuit board 48. Therefore, the RTC battery 45 and the auxiliary battery 46 are connected to a power supply (not shown) of the computer.

The opening 42 is closed with a battery cover 54 screwed on the housing 12. To replace the RTC battery 45 or the auxiliary battery 46 with a new one, the battery cover 54 is removed, the used RTC or auxiliary battery is removed from the battery storage portion 42, the connector 52 or 53 is disconnected from the connector 49 or 50, and a new RTC or auxiliary battery is connected to the connector 52 or 53.

Figure 7:
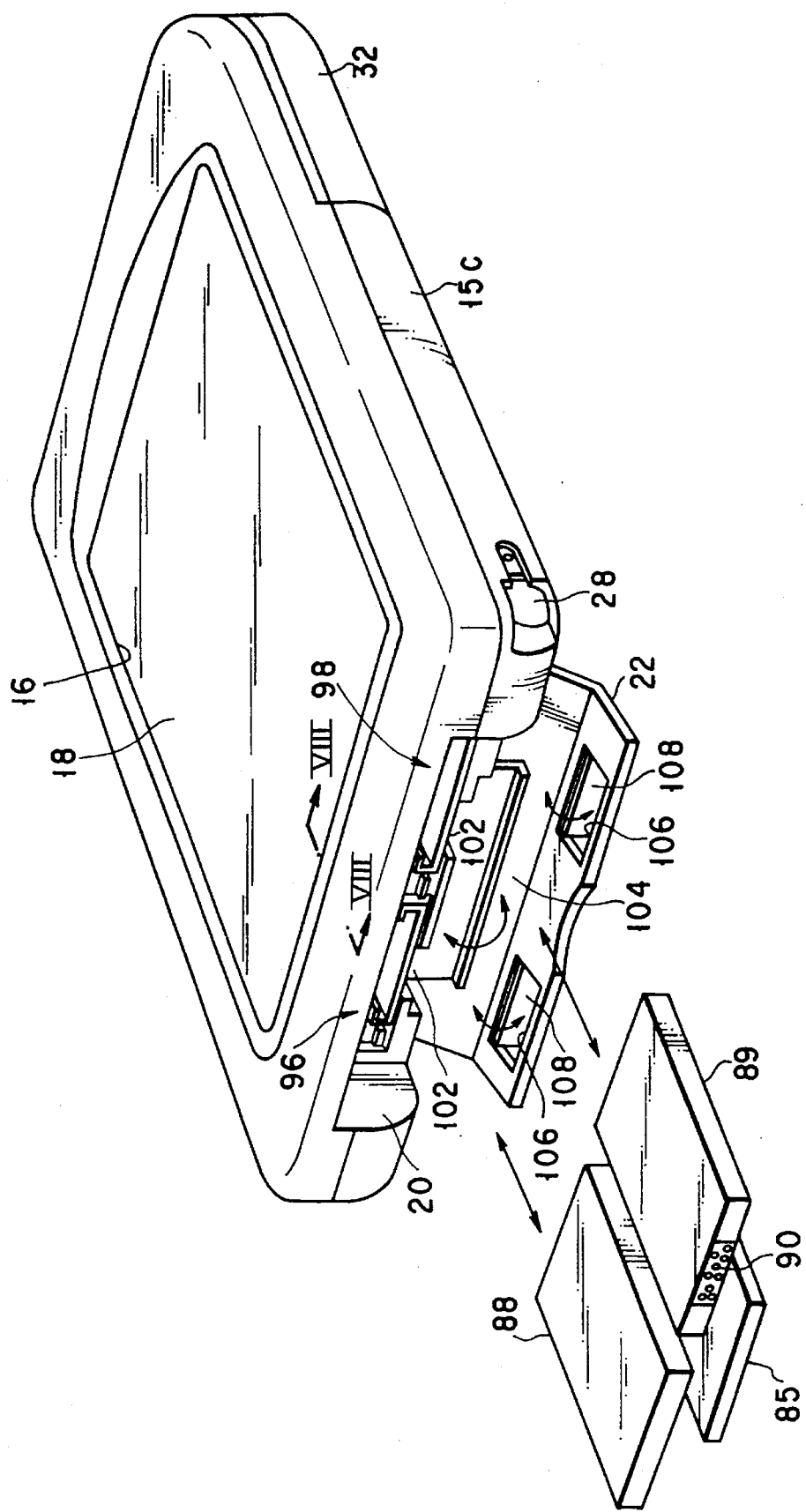
Figure 8:
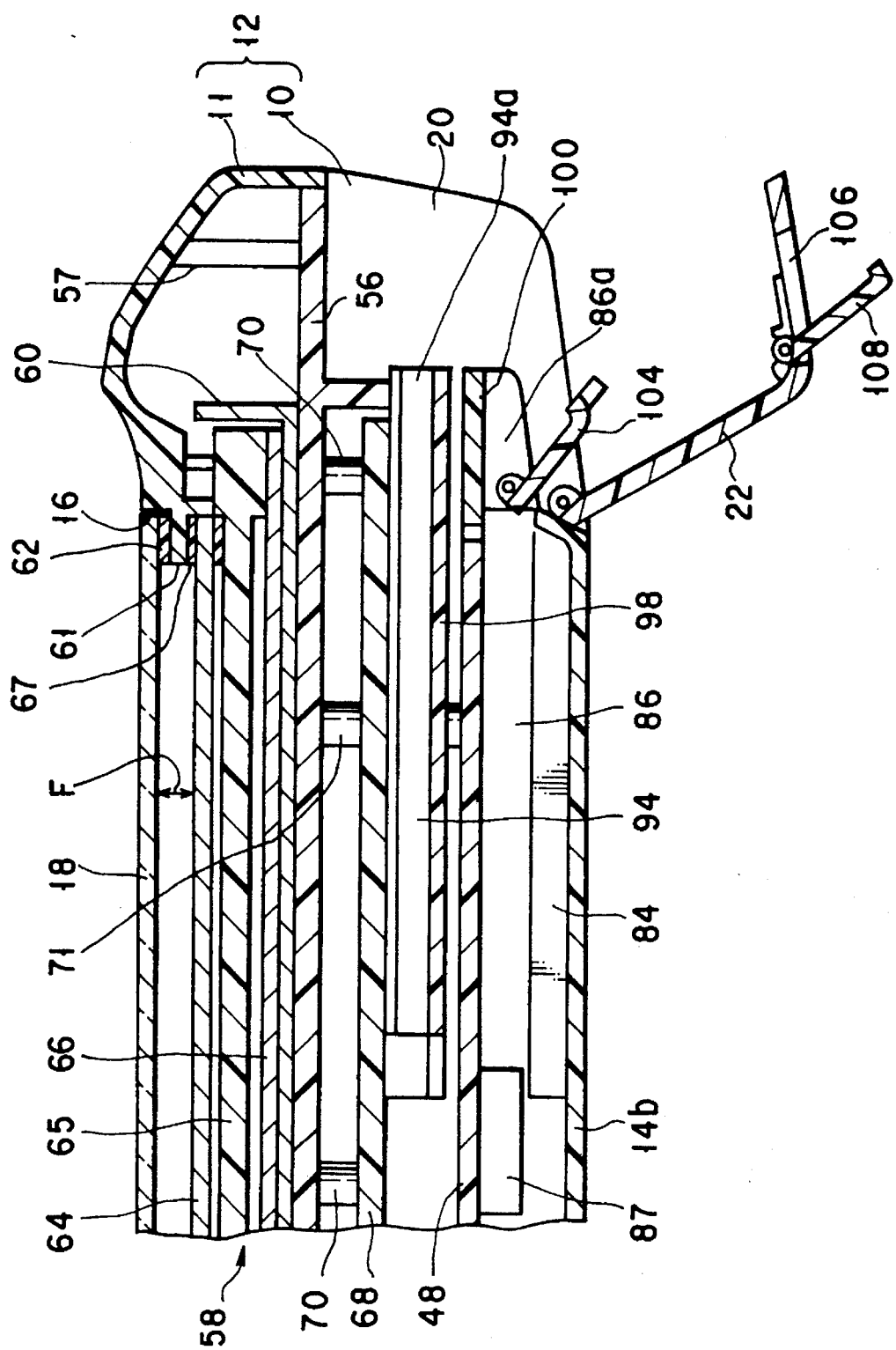
Figure 9:
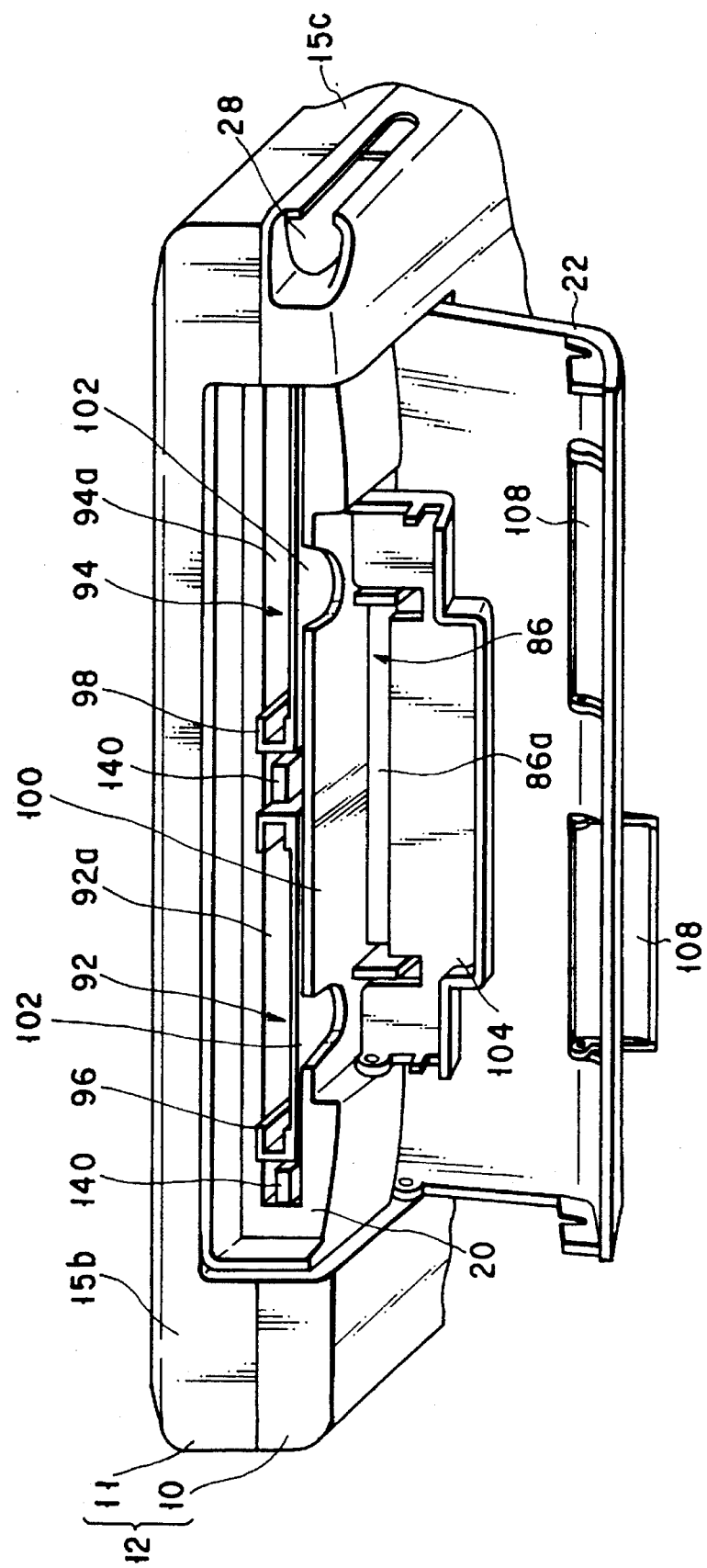
Figure 10:
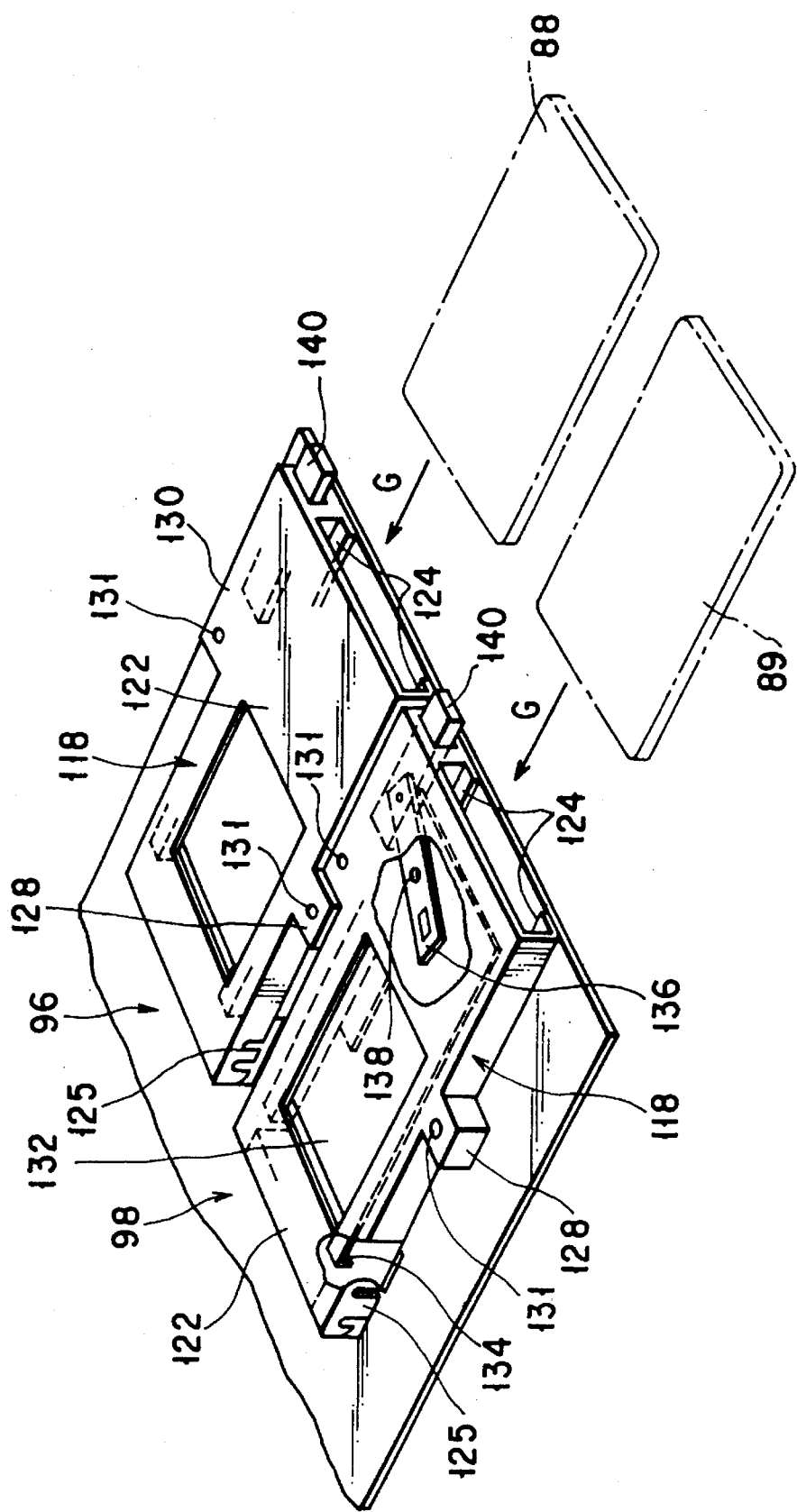
Figure 11:
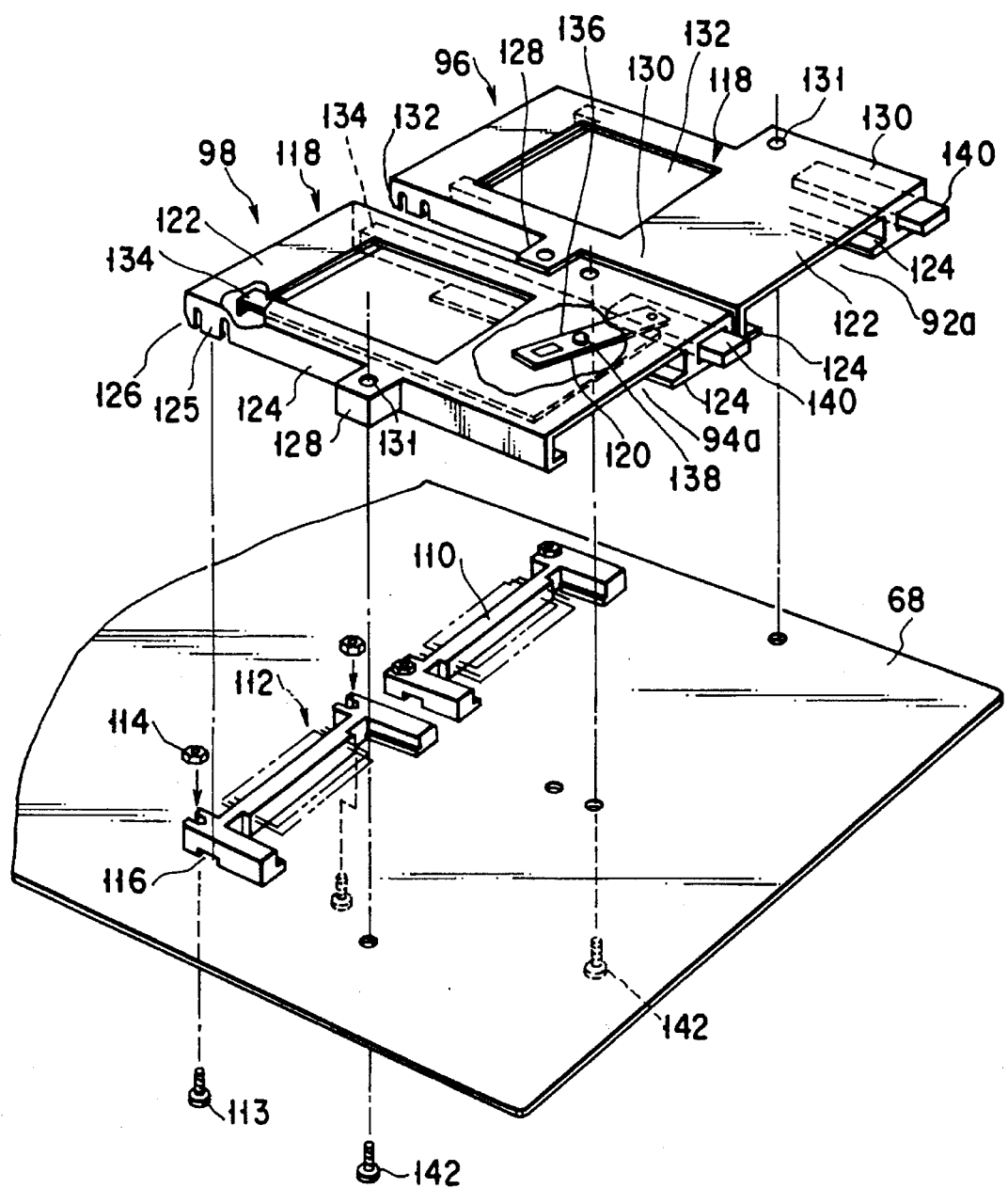

As shown in FIGS. 6 to 8, the housing 12 incorporates a support frame or a middle frame 56 having substantially the same size as that of the body case 10. The middle frame 56 is screwed on a plurality of bosses 57 projecting from the inner surface of the upper case 11. An input/display device 58 and a shielding plate 60 are disposed in the housing 12 in a state wherein they are clamped between the inner surface of the upper case 11 and the middle frame 56. The upper case 11 has a flange 61 formed along the edge of the opening 16. The peripheral edge portion of the transparent protective cover 18 which closes the opening 16 is fixed to the upper surface of the flange 61 through a double-coated tape 62.

The input/display device 58 comprises a display unit having a liquid crystal display panel 64 and a back light guide plate 65, and an input unit having a tablet plate 66. The panel 64, the plate 65, and the plate 66 are stacked in the order named. The input/display device 58 has a size slightly larger than that of the opening 16. The edge of the liquid crystal display panel 64 abuts against the lower surface of the flange 61 through silicone rubber 67. In this manner, the flange 61 and the silicone rubber 67 are interposed between the protective cover 18 and the liquid crystal display panel 64, so that a predetermined gap F is formed between the protective cover 18 and the liquid crystal display panel 64. The protective cover 18 will not be brought into contact with the liquid crystal display panel 64 due to the presence of the gap F even if the protective cover 18 is pressed by the stylus pen 26 and flexes, thereby preventing damage to the liquid crystal display panel 64. A fluorescent tube 73 serving as a light-emitting source is fixed to the light guide plate 56 and extends along the side edge of the plate 65 on the first side-surface side of the housing 12.

A first circuit board 68 and a second circuit board 48 are mounted on the middle frame 56 on a side opposing the body case 10. More specifically, the first circuit board 68 is screwed on low bosses 70 extending from the middle frame 56. The second circuit board 48 is screwed on high bosses 71 extending from the middle frame 56 and opposes the first circuit board 68.

The lower surface of the middle frame 56 serves as a component mounting surface for mounting the first and second circuit boards 68 and 48. The upper surface of the middle frame 56 serves as a press surface cooperating with the upper case 11 to clamp the input/display device 58 and the shielding plate 60. The middle frame 56 includes the battery storage portion 44 and an HDD storage portion 75 for storing a hard disk drive (to be referred to as an HDD hereinafter) 74 connected to the second circuit board 48 through a connector 77. The HDD 74 is located near that corner of the housing 12 which is defined by the first and fourth side surfaces 15a and 15d.

A pair of fitting projections 80 (only one is illustrated) are formed on an end portion of the middle frame 56 on the side of the first side surface 15a. An inverter circuit board 82 for applying a voltage to the fluorescent tube 73 mounted at the edge of the light guide plate 65 is fitted with these fitting projections 80. The inverter circuit board 82 extends in a direction perpendicular to the middle frame 56, and the first and second circuit boards 68 and 48. A support plate 79 on which various connectors 78 are mounted is fixed to the side edge of the second circuit board 48. These connectors 78 are located in the opening 23 formed in the fourth side surface 15d of the housing 12.

In assembling the computer, the transparent protective cover 18 is fixed to the flange 61 of the upper case 11 by means of the double-coated tape 62. The liquid crystal display panel 64, the light guide plate 65, the tablet plate 66, the shielding plate 60, and the middle frame 56 are stacked on the inner surface of the upper case 11. Then, the middle frame 56 is screwed on the upper case 11 to clamp and hold the liquid crystal display panel 64, light guide plate 65, tablet plate 66, and the shielding plate 60 between the middle frame 56 and the upper case 11. The first and second circuit boards 68 and 48 are screwed on the fixed middle frame 56 in the order named. The inverter circuit board 82 and the HDD 74 are mounted on the middle frame 56 and the second circuit board 48, respectively. Thereafter, the body case 10 is placed on the upper case 11 to complete the assembly.

A first card storage portion 86 for storing a volatile memory card 85 is defined between the second circuit board 48 and the body case 10 by a plurality of guide ribs 84 which project from the inner surface of the body case 10. The first card storage portion 86 is located adjacent to the second side surface 15b of the housing 12. On the second circuit board 48 is mounted an 88-pin first card connector 87 to which the memory card 85 stored in the first card storage portion 86 is to be connected.

Second and third card storage portions 92 and 94 for storing an application card 88 or an interface card 89 having external terminals 90 are defined between the first and second circuit boards 68 and 48. The second and third card storage portions 92 and 94 are located adjacent to the second side surface 15b of the housing 12. Card ejectors 96 and 98 for holding the cards in the second and third card storage portions 92 and 94 and ejecting the cards therefrom are fixed to the first circuit board 68. The first card storage portion 86 is stacked with the second and third card storage portions 92 and 94 in the direction of thickness of the housing 12, i.e., in a direction perpendicular to the upper and bottom surfaces of the housing.

As shown in FIGS. 6 to 9, the recess 20 is formed in the second side surface 15b of the housing 12. Insertion ports 86a, 92a, and 94a of the first to third card storage portions 86, 92, and 94 are open to the recess 20, i.e., the second side surface 15b of the housing 12. The insertion port 86a of the first card storage portion 86 and the insertion ports 92a and 94a of the second and third card storage portions 92 and 94 are overlapped with each other in the direction of thickness of the housing 12. The memory card 85 inserted through the insertion port 86a is guided by the guide ribs 84, stored in the first card storage portion 86, and connected to the first card connector 87. The insertion port 86a is partitioned from the insertion ports 92a and 94a by a partition wall 100 constituting part of the body case 11. A pair of notches 102 are formed in the partition wall 100 so as to facilitate holding of the card 85 when the card is removed from the first card storage portion 86.

A first cover 104 is attached to the body case 10 in the recess 20 and rotatable between a closed position (FIG. 6) in which the insertion port 86a of the first card storage portion 86 is closed by the cover 104 and an opened position (FIGS. 7 and 9) in which the insertion port 86 is open. As described above, the second cover 22 is mounted on the body case 11 and rotatable between a closed position (FIG. 2) in which the recess 20 is closed and an opened position (FIGS. 7 and 9) in which the recess 20 is open. When the second cover 22 is closed, the first cover 104 in its closed position and the insertion ports 92a and 94a of the second and third card storage portions 92 and 94 are closed by the second cover 22.

A pair of through ports 106 are formed in the second cover 22. When the second cover 22 is closed, these through ports 106 oppose the insertion ports 92a and 94a, respectively. A pair of third covers 108 for opening and closing the through ports 106 are mounted on the second cover 22. By opening only the third cover 108 while the second cover 22 is kept closed, only the corresponding insertion port 92a or 94a is exposed. When only one third cover 108 is opened while the interface card 89 is stored in the second or third card storage portion 92 or 94, a cable can be connected to the connecting terminals 90 of the interface card 89 through the through port 106. In this case, the other insertion port is covered with the second cover 22, thereby preventing dust and the like from entering inside the computer.

As shown in FIGS. 6 and 9 to 11, on the first circuit board 68 are mounted 68-pin second and third card connectors 110 and 112 to which cards inserted into the second and third card storage portions 92 and 94 are to be connected, and the card ejectors 96 and 98. Each of the second and third card connectors 110 and 112 is fixed to the first circuit board 68 by screws 113 and nuts 114 and has fitting grooves 116 at both ends thereof.

Since the card ejectors 96 and 98 have the same structure, only the card ejector 96 will be described below. The card ejector 98 comprises an ejector main body 118 and an inserting/ejecting mechanism 120 attached to the ejector main body 118. The main body 118 comprises an substantially rectangular upper wall 122 opposing the first circuit board 68 to be spaced apart therefrom at a predetermined distance, and a pair of guide rails 124 parallel to both the side edges of the upper wall and in contact with the first circuit board 68. The main body 118 and the first circuit board 68 define the third card storage portion 94 having the insertion port 94a.

The rear end portion of the ejector main body 118 is located on the second card connector 112. A fitting pawl 125 is formed on the rear end portion of each guide rail 124 and fitted in the fitting groove 116 of the card connector 112. These fitting pawls 125 have a semicircular sectional shape so as to be smoothly removed from the fitting grooves 116 when the end portions of the ejector main body 118 on the insertion port side are lifted. A corner 126 of the rear end of each guide rail 124 is notched to have a tapered shape.

The ejector main body 118 has a fixing portion 128 projecting outward from one guide rail 124 and an ejector button storage portion 130 projecting outward from the other guide rail. The fixing portion 128 and the storage portion 130 are formed integrally with the main body 118 by a synthetic resin. Screw holes 131 are formed in the fixing portion 128 and the storage portion 130, respectively. The height of the fixing portion 128 projecting from one guide rail 124 is set equal to that of the storage portion 130. The fixing portion 128 is offset toward the third card connector 112 in a card insertion direction G with respect to the storage portion 130. That portion of each guide rail 124 which is located between the rear end of the ejector main body 118 and the fixing portion 128 is lower than the remaining portion of the guide rail so as to define a small gap with the first circuit board 68.

The inserting/ejecting mechanism 120 has an ejector plate 132 attached to the inner surface of the upper wall 122 and being slidable in the card insertion direction G. This ejector plate 132 has a pair of push pawls 134 which abut against the leading end of the card inserted into the third storage portion 94. A pivot arm 136 is disposed between the upper wall 122 and the ejector plate 132. The intermediate portion of the pivot arm 136 is supported on the upper wall 122 to be rotatable about a pivot shaft 138. One end portion of the pivot arm 136 is rotatably connected to the ejector plate 132, and the other end portion of the pivot arm 136 extends inside the ejector button storage portion 130.

An ejector button 140 is inserted in the storage portion 130 so as to be slidable in the card insertion direction G. The other end of the pivot arm 136 is rotatably connected to the ejector button 140. The ejector button 140 is almost entirely stored in the storage portion 130, and only the distal end portion thereof extends outward from the storage portion 130 and is located adjacent to the insertion port 94a.

In mounting the card ejector 98 having the above structure on the first circuit board 68, the fitting pawls 125 are fitted in the corresponding fitting groove 116 of the connector 112 so as to place the rear end portion of the ejector main body 118 on the third card connector 112. Screws 142 are threadably engaged into the screw holes 131 of the ejector main body 118 upward from below the first circuit board 68, thereby fixing the card ejector 98 to the first circuit board 68.

The card ejector 96 is also fixed to the first circuit board 68 in the same procedures as described above, so that the card ejectors 96 and 98 are disposed parallel to each other. In this state, the fixing portion 128 of the card ejector 96 is aligned with the storage portion 130 of the card ejector 98 in the card insertion direction G. The projecting end of the fixing portion 128 abuts against the guide rail 124 of the card ejector 98, and the projecting end of the storage portion 130 abuts against the guide rail of the card ejector 96. For this reason, the distance between the two card ejectors 96 and 98 can be reduced to be substantially equal to the height of the fixing portion 128 projecting from the corresponding guide rail. As a result, the mounting space for the two card ejectors 96 and 98 in the housing 12 can be reduced, the mounting efficiency of the respective components can be improved, and the housing can be made compact.

Figure 12:
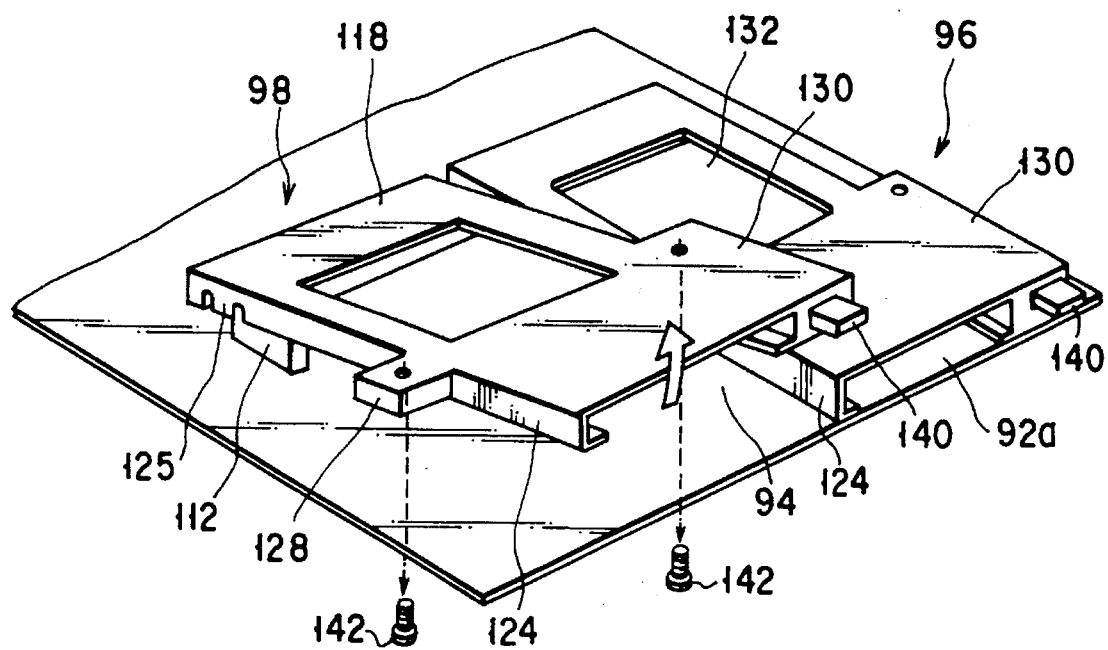

To detach the card ejector 98 from the first circuit board 68, the screws 142 are removed, and the end portion of the ejector main body 181 on the insertion port side is lifted, as indicated by an arrow in FIG. 12, to disengage the fitting pawls 125 from the fitting grooves 116 of the third card connector 112. At this time, the rear half portion of each guide rail is slightly spaced apart from the first circuit board 68, and the rear end or corner 126 of the guide rail is notched in the tapered shape. For this reason, when the distal end portion of the ejector main body 118 is lifted, the rear end portion of the main body 118 can be smoothly pivoted without being brought into contact with the first circuit board 68. Even if a space for inserting even a finger is not present between the two card ejectors 96 and 98, the card ejectors can be easily detached from the first circuit board 68. Thus, maintenance of the card ejectors can be facilitated. When one card ejector has failed, only the defective card ejector can be replaced with a new one.

When a card is inserted into the card ejector 98 having the above structure through the insertion port 94a, the card is guided forward by the pair of guide rails 124 and is electrically connected to the third card connector 112. Meanwhile, when the push pawls 134 are pushed by the leading end of the inserted card, the ejector plate 132 slides toward the second card connector 112. In interlock with the sliding of the ejector plate 132, the pivot arm 136 is pivoted. The ejector button 140 is then pushed by the pivot arm 136 and projects sideways the insertion port 94a.

To remove the card from the card storage portion 94, the ejector button 140 is pushed. Thus, the ejector plate 132 slides toward the insertion port 94a through the pivot arm 136. At this time, the leading end of the card is pushed by the push pawls 134 of the ejector plate 132, and the end portion of the card appears outside the insertion port 94a. The operator holds the extending end portion and removes the card from the card storage portion 94.

Figure 13:
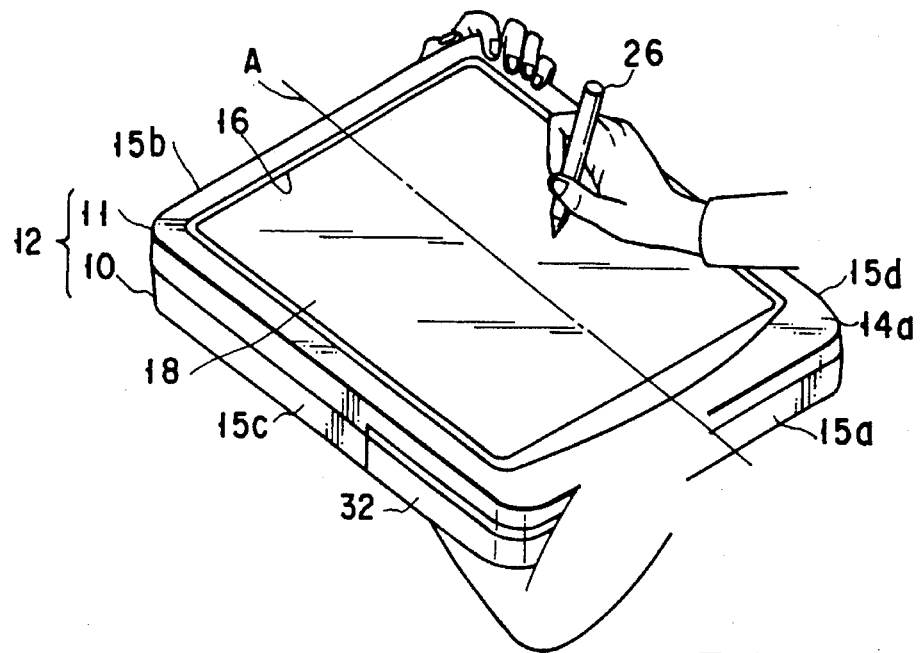

The computer having the above structure can be used in a state wherein a short or long side of the housing faces the operator. As shown in FIG. 13, when the computer is used such that a short side faces the operator, i.e., when the operator holds the computer such that the longitudinal axis A of the computer extends in a direction crossing the body of the operator, the first side surface 15a of the housing 12 faces the operator. When the operator inputs a signal on the input/display device through the protective cover 18 by means of the stylus pen 26, desired information is displayed on the liquid crystal display panel of the input/display device.

Assume that the computer is used such that the short side faces the operator. In this case, the battery pack 32 heaviest among the constituent components of the computer is located at the corner defined by the first and third side surfaces 15a and 15c of the housing 12. The relatively heavy HDD 74 is located near the housing corner defined by the first and fourth side surfaces 15a and 15d. That is, both the battery pack 32 and the HDD 74 are located on the side of the first side surface 15a, i.e., on the side of the operator. When the user holds the computer, therefore, the center of gravity of the computer is located close to the operator, and the operator can stably hold the computer.

The opening 16 formed in the upper surface 14a of the housing 12 is offset toward the second side surface 15b of the housing 12, and the width of that portion of the upper surface 14a of the housing which is located between the first side surface 15a and the edge of the opening 16 is larger than the remaining portion on the upper surface 14a. Even if a signal is input at the lower end portion of the protective cover 18, therefore, the operator can place the palm of his hand on the upper surface 14a of the housing 12, and the input operation can be stably performed. Operability of the computer is thus improved.

Figure 14:
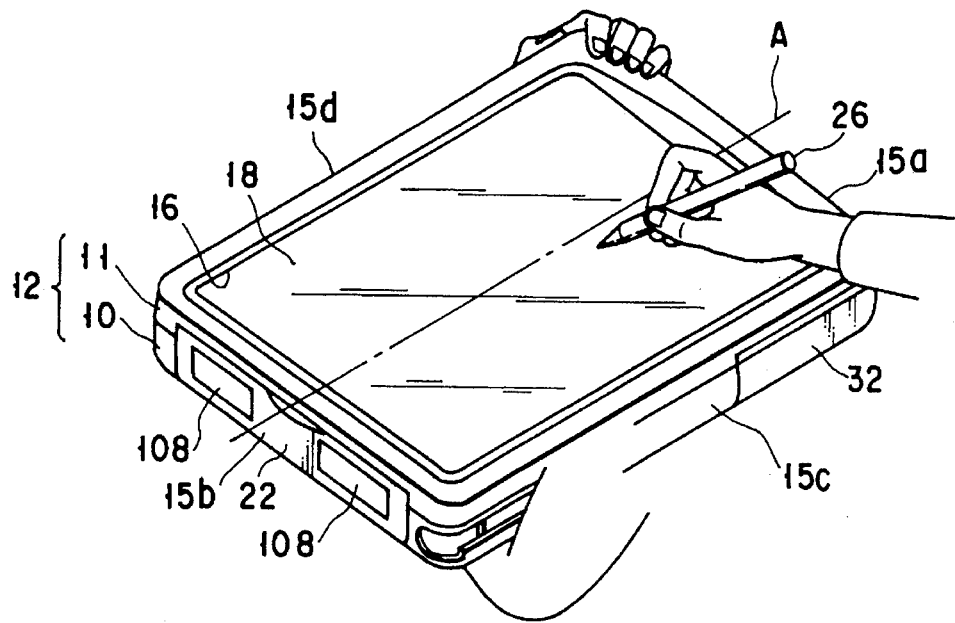

On the other hand, as shown in FIG. 14, when the computer is used such that its long side faces the operator, i.e., when the operator holds the computer such that the longitudinal axis A of the computer extends in a direction substantially parallel to the surface of the body of the operator, the third side surface 15c of the housing 12 faces the operator. In this case, the heaviest battery pack 32 is located at the corner defined by the first and third side surfaces 15a and 15c of the housing 12, i.e., on the operator's side. Even in the state wherein the long side of the housing faces the operator, the center of gravity of the computer is located adjacent to the operator, and thus the operator can stably hold the computer.

In the state wherein a short or long side of the housing faces the operator, the second side surface 15b having the insertion ports for a plurality of cards and the fourth side surface 15d having connectors for connecting various external devices are located outside, i.e., away from the operator. Therefore, even if the cables of various external devices are connected to card or the connector, these cables do not interfere with input operations. At the same time, the cards can be easily mounted or dismounted while the operator holds the computer. Therefore, the operability of the computer can be improved.

This embodiment exemplifies a display/input integral type computer. However, the present invention is not limited to the above embodiment and applicable to another apparatus such as a wordprocessor, an electronic notebook, and the like, as a matter of course. The present invention is also applicable to an information processing apparatus having a normal keyboard.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable information processing apparatus comprising:

a housing storing electronic components, the housing including an upper surface, a bottom surface, side surfaces continuous with the upper and bottom surfaces, and a plurality of storage portions having insertion ports open to one side surface of said housing, respectively, for storing optional components;

input/display means arranged in the housing and constituting at least a part of the upper surface of the housing, for displaying information and inputting data;

a first cover provided on the housing to be rotatable between a closed position, wherein the insertion port of one of said plurality of storage portions is closed by the first cover, and an opened position wherein the insertion port of said one storage portion is open; and a second cover provided on the housing to be rotatable between a closed position, wherein the first cover located in the closed position and the insertion port of another storage portion are covered with the second cover, and an opened position wherein the first cover and the insertion port of said another storage portion are exposed.

2. An apparatus according to claim 1, wherein said plurality of storage portions include a first storage portion for storing a volatile memory card, the first storage portion having said insertion port opened and closed by the first cover.

3. An apparatus according to claim 2, wherein said plurality of storage portions include a second storage portion for storing a card-like component having a connecting terminal connectable to a cable, and said second cover comprises a through port opposing the insertion port of the second storage portion at the closed position, and a third cover provided on the second cover so as to be movable between a closed position wherein the through port is closed and an opened position wherein the through port is open.

4. An apparatus according to claim 1, wherein said plurality of storage portions include a first storage portion having an insertion port open to said one side surface and a second storage portion having an insertion port open to said one side surface, said first and second storage portions being aligned one above the other and partially offset from each other.

5. An apparatus according to claim 4, which further comprises first and second circuit boards opposing each other and arranged in the housing substantially in parallel to the upper surface, a first connector arranged on the first circuit board and connected to the optional component stored in the second storage portion, and a second connector arranged on the second circuit board and connected to the optional component stored in the first storage portion.

6. A portable information processing apparatus comprising:

a flat box-like housing including an upper surface, a bottom surface, side surfaces continuous with the upper and bottom surfaces, and a plurality of storage portions which are defined in the housing and have insertion ports open to one of the side surfaces, respectively, for storing optional components;

a first cover provided on said one side surface of the housing to be rotatable between a closed position, wherein the insertion port of one of said plurality of storage portions is closed by the first cover, and an opened position wherein the insertion port of said one storage portion is open; and a second cover provided on the housing to be rotatable between a closed position, wherein the first cover located in the closed position and the insertion port of another storage portion are covered with the second cover, and an opened position wherein the first cover and the insertion port of said another storage portion are exposed;

the first and second covers having rotational center axes which are substantially parallel to each other.

7. An apparatus according to claim 6, further comprising: input/display means provided at the housing and constituting at least a part of the upper surface of the housing for displaying information and inputting data.

8. An apparatus according to claim 6, wherein: said rotational center axes of the first and second covers extend substantially parallel to the upper and bottom surfaces of the housing.

9. A portable information processing apparatus comprising:
- a housing storing electronic components, the housing including a first storage portion for storing a first card-like electronic component, and a second storage portion for storing a second card-like electronic component having a connecting terminal connectable to a cable, the first and second storage portions having insertion ports open to one side surface of said housing, respectively;
- a first cover provided on the housing to be rotatable between a closed position, wherein the insertion port of the first storage portion is closed by the first cover, and an opened position wherein the insertion port of the first storage portion is open;
- a second cover provided on the housing to be rotatable between a closed position, wherein the first cover located in the closed position and the insertion port of the second storage portion are covered with the second cover, and an opened position wherein the first cover and the insertion port of the second storage portion are exposed, the second cover having a through port opposing the insertion port of the second storage portion; and
- a third cover provided on the second cover to be rotatable between a closed position, wherein the through port is closed, and an opened position wherein the through port is open so as to allow a cable to pass the through port.

10. An apparatus according to claim 9, further comprising:

input/display means provided at the housing;

the housing having an upper surface, a bottom surface, and side surfaces continuous with the upper and bottom surfaces;

the input/display means constituting at least a part of the upper surface for displaying information and inputting data.

* * * * *